Aug. 15, 1972    E. BALL    3,684,602
MANUFACTURE OF FLEXIBLE HOSE PIPES
Filed Aug. 8, 1969
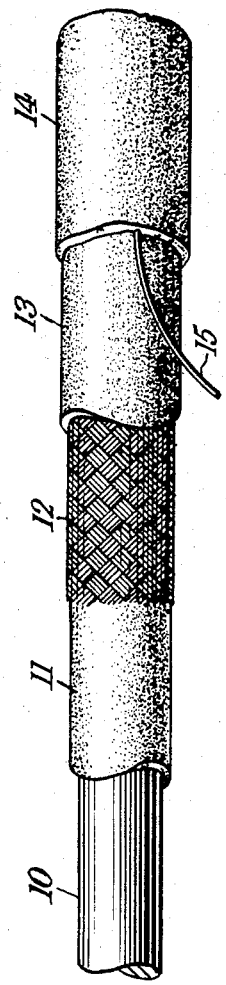
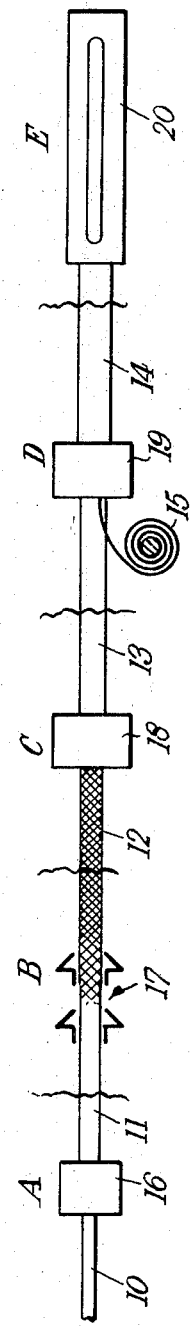
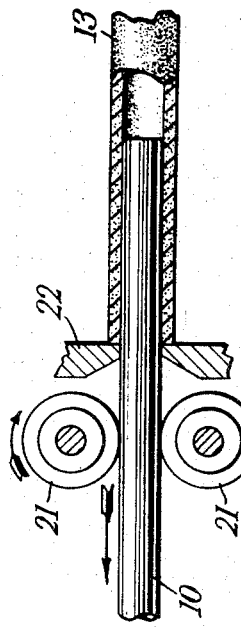
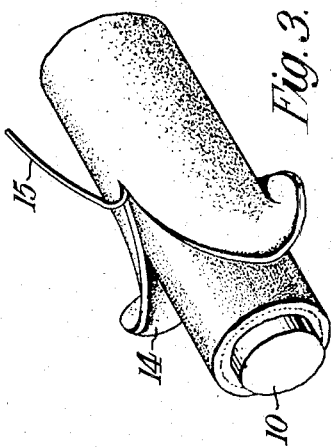
Inventor
Eric Ball
By
Watson, Cole, Grindle & Watson
Attorneys

United States Patent Office 3,684,602
Patented Aug. 15, 1972

3,684,602
MANUFACTURE OF FLEXIBLE HOSE PIPES
Eric Ball, Newcastle-upon-Tyne, England, assignor to George Angus & Company Limited, Newcastle-upon-Tyne, England
Filed Aug. 8, 1969, Ser. No. 848,535
Int. Cl. B29d 31/00
U.S. Cl. 156—149                                    4 Claims

ABSTRACT OF THE DISCLOSURE

A method of manufacturing a flexible hose pipe comprising an inner tubular layer of rubber, a surrounding lapped or braided reinforcement of metal wire or monofilament plastics material and an outer cover of synthetic rubber, in which a thin sheath of expendable rubber is applied over the outer cover to protect it during vulcanization and is stripped from the hose assembly after it has been vulcanized.

---

This invention relates to a method for the manufacture of flexible hose pipes of the type comprising applying to a mandrel an inner tubular layer of rubber, then applying a lapped or braided reinforcement of metal wire or monofilament plastics material, then extruding over the reinforcement a tubular outer cover of synthetic rubber and finally vulcanizing the assembly.

The extruded cover can be provided with a smooth outer surface in the extruded condition, and such a smooth exterior finish in the finished hose is highly prized by the customer in the case of the expensive hydraulic hose used for aircraft hydraulic systems and similar purposes.

Unless precautions are taken, the smooth surface finish is lost during vulcanization because the unvulcanized rubber of which the cover is composed is easily damaged by handling. Moreover, if the hose is vulcanized in a steam autoclave, small droplets of water tend to condense on the surface of the hose and afterwards evaporate, leaving unsightly marks.

Accordingly, in an attempt to maintain the smooth external finish, existing practice has been to extrude an outer sheath of lead over the hose before vulcanization. Another known procedure is to vulcanize the hose without any external sheathing in a metal mould. Neither of these expedients is very satisfactory. Sheathing with lead is expensive and liable to produce extrusion marks on the exterior of the hose. Furthermore the lead sheathing is not always extruded exactly concentrically with the hose with the result that the slitting knives used to remove the lead sheathing after vulcanization may damage the hose. Metal moulds are extremely expensive since different moulds must be used for each size of hose. Moreover, after repeated use the moulds tend to lose their surface finish and therefore to mark the exterior of the hose.

The invention provides a method of the above type for the manufacture of a flexible hose pipe in which a thin sheath of expendable rubber is applied to the hose assembly, after extrusion of the cover of synthetic rubber and prior to vulcanization, and is stripped from the assembly after vulcanization. In this way the surface finish of the outer synthetic rubber cover of the hose pipe is preserved at the expense only of the relatively small cost of the protective rubber sheath.

Vulcanization can be effected in any convenient way and the method according to the invention may be usefully applied by manufacturers in possession of lead sheathing equipment or metal moulds since the rubber sheath will protect the hose proper from extrusion marks, damage from slitting knives and marking by imperfect moulds.

The main advantage of the method according to the invention is, however, that vulcanization can be effected in a steam autoclave or in a fluidised-bed vulcanizer, i.e. a vulcanizer in which the hose is drawn through a mass of fine glass balls fluidised by a current of air or steam from beneath.

The inner lining tube will, of course, be of synthetic rubber when the hose is to be used for conveyance of oil and other liquids which attack natural rubber. The wires constituting the reinforcement may be wound on the hose as a band of contacting wires bonded together by rubber. The extruder used for applying the cover of the hose pipe preferably includes means for applying vacuum to remove air or vapour which might otherwise be trapped in the hose assembly. If desired, the hose pipe may be subjected to heat on its way to the extruder to assist in preventing air or vapour from becoming trapped in the hose assembly. If desired an adhesive, e.g. a solution of synthetic rubber, may be applied to the reinforcement prior to extrusion of the outer cover to assist in bonding the outer cover to the reinforcement.

Both the outer cover and the inner lining tube may be any desired type of synthetic rubber, e.g. polyvinyl chloride/acrylonitrile, neoprene, hypalon or butyl rubber.

The protective sheath may consist of natural rubber or cheap general purpose synthetic rubber and will normally have a thickness of 0.02–0.03 inch. It is most conveniently applied to the hose assembly by extrusion in the unvulcanized state, in which case it is convenient to introduce through the extruder a fine longitudinally extending wire disposed between the sheath and the exterior of the cover of the hose pipe. This wire can then be pulled outwardly after vulcanization to slit the sheath. When the sheath is applied in the unvulcanized state a suitable separating medium, e.g. of silicone oil, is applied to the cover of the hose pipe before application of the sheath to ensure that the sheath will not bond to the cover. In the case of short hose pipes, of up to 100 feet in length, the sheath may be a vulcanized rubber tube which is drawn over the hose pipe assembly on the mandrel.

In the case of short hose pipes a rigid mandrel may be used but for long hose pipes, having a length of 600 feet or more, it is necessary to use a flexible mandrel, for example of nylon, which can be coiled. The nylon mandrel may be a solid rod or may have a throughgoing central hole.

In a typical example of the manufacture of a long length of hose pipe, the flexible mandrel is drawn from a coil through an extruder which applies the inner rubber lining tube, cooled and re-coiled. The assembly is then drawn through a braiding machine which applies the reinforcing wire braiding and coiled again. The assembly is then passed through another extruder which applies the synthetic rubber cover, cooled and coiled again. The assembly is then drawn through a final extruder, on the way to which it receives a coating of silicone oil and in which it receives the sheathing of expendable rubber and the fine wire. The final assembly is coiled flat in a tray and can then be vulcanized in a steam autoclave. Thereafter the sheath is slit and removed.

If it should be desired to vulcanize in a steam autoclave a long length of hose pipe coiled on a drum, the hose pipe should be given an external wrapping of cheap textile material outside the sheath to keep the hose taut and prevent deformation under the stresses imposed when on the drum.

The procedure is illustrated in the accompanying diagrammatic drawings, in which:

FIG. 1 is a perspective view of the hose pipe as assembled prior to vulcanization, FIG. 2 shows the various operations involved in the production of the assembly shown in FIG. 1, FIG. 3 illustrates stripping of the sheath, and FIG. 4 illustrates removal of the mandrel.

The assembly shown in FIG. 1 includes the inner mandrel 10, the rubber lining tube 11, the braided reinforcement 12, the outer cover 13 of synthetic rubber, the expendable rubber sheath 14 and the wire 15.

FIG. 2 shows the complete series A-E of operations involved in producing the assembly shown in FIG. 1, the broken lines between stages being intended to represent that the hose assembly does not proceed continuously from one stage to the next.

In stage A, the mandrel passes through an extruder 16 which applies to it the inner rubber lining tube 11. In stage B the assembly passes through a braiding machine 17 which applies the braided reinforcement 12. In stage C the assembly passes through an extruder 18 which applies the synthetic rubber cover 13. In stage D, the assembly passes through an extruder 19 which applies the wire 15 and the sheath 14. The assembly is then placed in a steam autoclave 20 in which it is vulcanized. Alternatively it may be drawn through a fluidised bed vulcanizer.

After vulcanization, the wire 15 is pulled outwardly as shown in FIG. 3 to strip off the sheath 14. When the hosepipe is made in relatively short lengths and a rigid mandrel is used, the mandrel 10 is removed by rollers 21 as shown in FIG. 4, an abutment 22 being provided to prevent the hose assembly from following the mandrel.

When the hosepipe is made in long lengths, a flexible nylon mandrel is used and the hose assembly is coiled as required between stages. In this case the mandrel is ejected from the vulcanized hose by fluid pressure.

The following are typical examples:

EXAMPLE 1

A hose for use in hydraulic oil circuits and comprising an inner lining of compounded acrylonitrile synthetic rubber, a reinforcing braid of high tensile steel wire and an outer cover of compounded synthetic rubber based on a blend of polyvinyl chloride and acrylonitrile polymers is manufactured as follows:

A steel mandrel ½" in diameter and 60 ft. long is covered with an extruded tube of acrylonitrile synthetic rubber compound having an internal diameter of ½" and an external diameter of ⅝". A layer of reinforcement is then applied by braiding 24 bands of high tensile brass plated steel wire onto the extruded tube, each of the 24 bands of wire comprising 7 wires each of .012" diameter and 160 tons/sq. inch tensile breaking strength. An outer cover of polyvinyl chloride/acrylonitrile synthetic rubber compound having an external diameter of 0.900" is then extruded over the wire braid. During this operation a vacuum is applied in the extruder head to remove substantially all the air or volatile materials which would otherwise be entrapped under the extruded cover. The hose thus formed is then covered by extrusion with an expendable sheath, .030" thick, of a natural rubber compound. In this operation a coating of silicone oil is applied to the hose cover as it passes into the extruder so as to prevent undesirable adhesion occurring between the hose cover and the outer sheath. A vacuum is applied during sheathing in order to remove substantially all the air or volatile materials which would otherwise be entrapped under the sheath. A wire of .012" diameter is allowed to enter the extruder head together with the hose, so that the sheath may form over it. The sheathed hose is next placed on a suitable supporting surface in a steam autoclave, and subjected to vulcanization for a period of 30 minutes at 50 p.s.i. steam pressure. After vulcanization the sheathed hose is removed from the steam autoclave. The wire underlying the sheath is then removed by tensioning the end of the wire at approximately 90° to the hose longitudinal axis, so as to tear through the outer sheath. The outer sheath thus slit is now readily removed from the hose. The steel mandrel is then withdrawn from the hose.

EXAMPLE 2

In manufacture of a similar hose, in long lengths, say 600 ft., a flexible nylon mandrel is employed.

The hose is manufactured in similar fashion excepting that the long length requires the hose to be coiled between each operation.

After applying the outer sheath a temporary wrapping of woven cotton fabric is spirally applied to protect the sheath and the hose contained therein. The hose is then coiled on a drum and vulcanized in a steam autoclave and the temporary wrapping removed. The sheath is then removed and the hose freed from the mandrel by applying water to the end of the hose sufficient in pressure to penetrate along the interface between the hose bore and the mandrel surface and sufficient in volume to push the mandrel out of the hose.

EXAMPLE 3

A hose for hydraulic circuits comprises an inner lining of compounded polychloroprene, a reinforcement of high tensile steel wire braided in two layers with an interlayer sheet of resilient compounded natural rubber and an outer cover of compounded polychloroprene.

A steel mandrel ½" diameter and 60 ft. long is covered with an extruded tube of polychloroprene rubber compound having an internal diameter of ½" and an external diameter of 0.650". A layer of reinforcement is then applied by braiding 24 bands of high tensile brass plated steel wire on to the extruded tube, each of the bands of wire comprising 8 wires each of .012" diameter and 160 tons/sq. inch tensile breaking load. A second layer of reinforcement is braided using the same number of wire bands of 9 wires. An interlayer of resilient natural rubber compound .015" is incorporated between the braids by introduction into the braiding machine with the product during the braiding of the second layer of reinforcement. An outer cover of compounded polychloroprene is then extruded over the second braided layer after application to it of a bonding solution of polychloroprene compound dissolved in toluol.

The hose thus constituted is then covered by extrusion within an expandable sheath .030" thick of a styrene-butadiene rubber compound. This operation and the subsequent procedure to complete the process are the same as in Example 1.

EXAMPLE 4

A hose for hydraulic circuits comprises an inner lining of compounded acrylonitrile synthetic rubber, a layer of nylon leno fabric, four layers of spirally applied wire reinforcement each with an underlying thin sheet of a polychloroprene compound, and a cover of chlorosulphonated polyethylene "Hypalon" synthetic rubber compound.

A steel mandrel ⅝" diameter is covered with an extruded tube having an outside diameter of 0.5" of acrylonitrile synthetic rubber. A layer of fine nylon leno fabric is spirally wound over the lining to provide stabilizing support when the over-lying layers are being formed. Four layers of high tensile steel wires are spirally applied, each with an under-lying layer of .012" thick polychloroprene sheeting. The layers of wire comprises brass plated steel wire of .015" diameter and 160 tons/sq. inch breaking strength, the layers containing respectively 72, 72, 75, and 75 wires to form the 1st, 2nd, 3rd and 4th layers. The wire layers are wound alternately right and left handed to form a balanced construction. A cover of compounded "Hypalon" having an outside diameter of 0.483", is then extruded on to the hose, having an OD of 0.483".

The hose thus constituted is covered by extrusion with an expandable sheath of .030" thickness of a styrene-butadiene rubber compound. This operation and subsequent procedure are as given in Example 1.

What I claim as my invention and desire to secure by Letters Patent is:

1. A method for the manufacture of a flexible hose pipe which comprises applying to a mandrel an inner tubular layer of rubber, then applying over said layer a lapped or braided reinforcement of metal wire or monofilament plastics material, then extruding over the reinforcement a tubular outer cover of synthetic rubber, then extruding a thin sheath of expandable rubber in an unvulcanized condition over the outer cover, disposing a fine longitudinally extending wire between the sheath and the cover during the step of extruding, then vulcanizing the assembly and finally stripping the sheath of expendable rubber from the assembly by drawing the wire outwardly after extrusion to slit the sheath, and removing the mandrel.

2. A method as claimed in claim 1, in which the sheath has a thickness of 0.02–0.03 inch.

3. A method as claimed in claim 1, in which the hose is vulcanized in a steam autoclave.

4. A method as claimed in claim 1, in which the hose is vulcanized in a fluidised bed vulcanizer.

References Cited

UNITED STATES PATENTS

| | | | |
|---|---|---|---|
| 2,392,967 | 1/1946 | Balkin | 156—149 |
| 2,724,673 | 11/1955 | Hurter | 156—149 |
| 3,038,523 | 6/1962 | Merck et al. | 156—149 X |
| 3,062,241 | 11/1962 | Brumbach | 156—149 X |
| 3,242,528 | 3/1966 | Elder | 18—6 |
| 3,310,447 | 3/1967 | Matthews | 156—244 |
| 3,414,448 | 12/1968 | Harpfer | 156—149 |
| 2,984,262 | 5/1961 | Agmami et al. | 156—247 X |
| 2,783,173 | 2/1957 | Walker et al. | 156—247 X |
| 2,571,717 | 10/1951 | Howald et al. | 156—247 X |
| 3,430,543 | 3/1969 | Cunningham | 156—248 X |

CARL D. QUARFORTH, Primary Examiner

G. G. SOLYST, Assistant Examiner

U.S. Cl. X.R.

156—244, 247